United States Patent Office 3,350,446
Patented Oct. 31, 1967

3,350,446
PROCESS FOR PREPARING BISACETAMIDES
William F. Bruce, Havertown, Pa., assignor to American Home Products Corporation, New York, N.Y., a corporation of Delaware
No Drawing. Filed June 30, 1964, Ser. No. 379,389
3 Claims. (Cl. 260—559)

ABSTRACT OF THE DISCLOSURE

Hydroxyalkylimino bis[N-aralkyl-N-lower alkyl-alkanoylamides] (I) are provided by an improved process comprising reacting a lower alkanolamine with an alpha halo fatty acid amide in dimethylformamide in the presence of a trialkylamine. Compounds I are gastric mucosal anesthetics useful to treat peptic ulcer, chronic esophagitis and gastritis.

---

The present invention relates to an improved method for the synthesis of chemical compounds generally referred to as bisacetamide. In particular the invention concerns the preparation of the therapeutic agent 2,2'-(2-hydroxyethyl-imino) bis[N-(a,a-dimethylphenylethyl)-N-methylacetamide]. This drug product is a commercially successful gastric mucosal anesthetic particularly efficacious in the treatment of peptic ulcer, chronic esophagitis, gastritis and the like.

The type of compounds which generally may be prepared in the manner of my improved synthesis may be illustrated by reference to the following graphic structure:

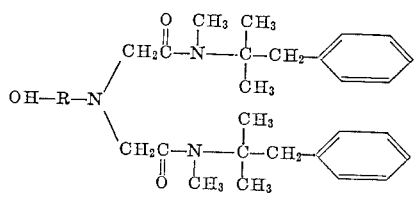

wherein R preferably represents either an ethylene or a propylene group of the divalent lower alkylene series of 2 to 4 carbon atoms.

The above compounds have been prepared previously by the technique generally indicated in U.S. Patent 2,780,646 to Seifer et al. issued Feb. 5, 1957. In its most broad aspect the previous technique as well as the present improvement thereon may be employed to prepare compounds having the general representation:

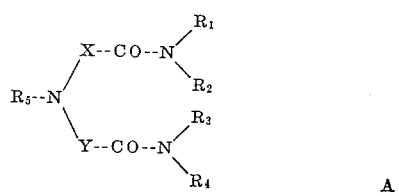

wherein $R_1$ and $R_3$ are intended to stand for lower alkyl radicals while $R_2$ and $R_4$ represent aralkyl radicals; $R_5$ represents a hydroxy or acid ester substituted lower alkyl radical. The symbols X and Y are intended to represent divalent lower alkylene radicals.

As additional variations thereon the aralkyl radicals $R_2$ and $R_4$ may represent phenyl or substituted phenyl lower alkyl radicals wherein such substituents as lower alkyl, lower alkoxy, hydroxy, halogen, nitro, amino, mono- or di-lower alkylamine, may be on the ring. In the case of aralkyls of the β-phenylethyl type hydroxy substituents on the β-carbon of the alkyl are also contemplated. With regard to $R_5$ the lower alkylene portion of the radical should have from 2 to 4 carbon atoms.

Compounds falling within the scope of the formula as given above may be used in the form of their acid addition salts with non toxic organic or inorganic acids while still retaining their effectiveness for local anesthetic use; hence, the non toxic acid addition salts are preferred in normal closage.

As noted in the aforesaid patent the prior method of preparation of the above compounds involves reacting a lower alkanolamine with an alpha-halo-fatty acid amide in a mole ratio of 1:1 or 1:2 but preferably with a slight excess of the fatty acid amide. The halogen atom of the halogenated fatty acid amide may be either chlorine or bromine. The reaction is carried out under the reaction conditions indicated in Bruce et al. Patents 2,568,142 of Sept. 18, 1951, or 2,654,754 of Oct. 6, 1953, suitably modified, of course, to provide the proper amine and halogenated reactants. For instance, the reaction temperature had been generally in the range of about 80° to about 200° C. but preferably operated in the narrower range of about 100 to 180° C. As reaction solvents in this method alcohols such as propanol, butanol, etc., anisole, dioxane or hydrocarbons such as xylene are noted for use. In practice, butanol was generally employed.

Acid acceptors or mildly basic material was also specified for the reaction such as pyridine or alkali metal carbonates or bicarbonates. In production runs potassium carbonate is generally employed.

The above process of the prior art, however, has the inherent limitations of (1) yielding final products in relatively low yields of the order of 60–65 percent due to hydrolytic cleavage and (2) the reaction is forced to proceed over a span of reaction time as long a period of twenty to twenty-four hours. In addition to these aforesaid drawbacks in some instances also, the desired products came off from the synthesis in an impure state. It is believed that by the method of synthesis of the present invention, all of these disadvantages have been overcome.

It is an object of the present invention therefore to disclose for the first time a new and improved method for the preparation of bisacetamides of the type generally shown above and particularly the commercial therapeutic compound 2,2'-(2-hydroxyethylimino) bis[N-(a,a-di-methylphenylethyl)-N-methylacetamide] as well as other similar di fatty acid amides shown in structure A.

Accordingly, I have now quite unexpectedly found that by my new method the yield of the valuable commercial therapeutic agent 2,2'-(2-hydroxyethylimino) bis[N-(a,a-dimethylphenylethyl)-N-methylacetamide] may be increased from a level of about 60% to a level of 90 to 95% of a substantially pure product. In addition by my novel method, the reaction time has been drastically reduced from a reaction time of 20 to 24 hours duration to reaction times of 1 hour or less at a substantial saving in time and cost of raw materials and more effective use of equipment in the manufacturing unit. The basic discovery which has now made possible this substantial saving in time and money is that alteration of the reaction conditions to concurrently (a) replace the butanol solvent employed for dissolution of the starting material chloroacetyl Wyamine (N-methyl-omega phenyl tertiary butylamine) with a quantity of the solvent dimethylformamide coupled with (b) the addition of triethylamine as the acid scavenger in place of the sodium carbonate formerly employed surprisingly achieves the unexpectedly advantageous results noted above. This inventive concept will be further elaborated below in the following description of my invention.

This new technique appears to substantially inhibit the hydrolytic cleavage which must result from the action of HCl initially liberated in the reaction on the anhydrous sodium carbonate previously used as the acid scavenger. The resultant carbonic acid formed gives water and $CO_2$.

Thus, to avoid such hydrolytic cleavage and increase the yield, the chloroacetyl N-methyl-omega phenyl tertiary butylamine is dissolved in dimethylformamide with the primary amine and with triethylamine present in moderate excess. After gentle heating for about 15 minutes, long needles of triethylamine hydrochloride are seen crystallizing from the solution and after half an hour these can be filtered off in nearly quantitative yield. Addition of water to the filtrate usually precipitates the product in good yield.

In summary then, the use of my new and critical reaction conditions effects a useful and unexpected beneficial alteration in both the quantity and quality of commercial therapeutic agent recovered from the process noted in U.S. Patent 2,780,646 as well as drastically altering the efficiency of the reaction in terms of reaction time and utilization of starting material.

By way of background of discovery of my new method of synthesis, it was based on the belief that hydrolytic or solvolytic cleavage was in fact reducing product yield and causing long reaction times to obtain products. After experimentation with various systems, it was unexpectedly found that the combination of dimethylformamide as solvent for the starting material and triethylamine as the scavenger for the reaction solved the problem in a manner not even hoped for at the onset.

It so happens that triethylamine hydrochloride is virtually insoluble in dimethylformamide and the progress of the reaction can be observed by watching the formation of long needles of this salt. At 70–80° C., the salt precipitates in 10–15 minutes and appears complete in half an hour. This reduces the reaction temperature requirement by at least 50–60° C. and the time of reaction by 13–47 hours, both of which are factors in decreasing the amount of side reaction products and, therefore, facilitating the purification of the product. In fact, 2,2′-(2-hydroxyethylimino)bis[N-(α,α-dimethylphenylethyl) - N - methylacetamide] prepared by this procedure showed even in the unrecrystallized form a melting point (104–5° C.) which is 28–30° C. higher than that published (Freed et al. J. Org. Chem. 26, 2379 (1961)). The yield was 98% of starting material.

The new method is particularly suited to the preparation of optically active products since the racemization which may occur during long exposure to a high temperature and relatively strong alkali, i.e., potassium carbonate is avoided. The considerable gain in the effective use of N-methyl-omega-phenyl tertiary butylamine is of very appreciable value.

The following example illustrates concretely the best mode of practice of my new method.

EXAMPLE

*Praparation of 2,2′-(2-hydroxyethylimino)bis[N-(α,α-dimethylphenethyl)-N-methylacetamide]*

Heat a mixture of 24.8 gm. (0.1 mole) of chloroacetyl (N-methyl-omega phenyl tertiary butylamine) in 30 ml. of dimethylformamide with 3.8 grams of ethanolamine and 15 grams of triethylamine at 77° for 15 minutes. At this point the solution is filled with long needles of triethylamine hydrochloride. After about 30 minutes of additional heating filter the salt off. The weight of product is 12 grams. (Theory is 13 grams.) Filtration is not necessary unless it is desired to recover the triethylamine.

Addition of 2 volumes of water gives an oil which on being stirred rapidly, solidifies to give a nearly white solid. Wash with hexane and dry to obtain 21.5 gram of product which melts sharply at 104–5°. (98% yield.) This compares with a 63% yield of a much lower melting product (74–6°) reported in the prior art.

Although in the above preferred embodiment which serves to illustrate my novel process the fatty acid amide employed is chloroacetyl (N-methyl-omega-phenyl tertiary butylamine) it is to be understood that the present process concept is an equally valuable technique for use equivalently with other related fatty acid amide starting materials such as the following, to name a few:

chloroacetyl(N-methyl-omega-phenyl ethylamine)
chloroacetyl(N-ethyl-omega-phenyl propylamine)
chloroacetyl(N-methyl-omega-phenyl methylamine)
chloropropionyl(N-methyl-omega-phenyl-tertiary butylamine)
chloropropionyl(N-methyl-omega-phenyl-propylamine)
bromoacetyl(N-methyl-omega-phenyl-tertiary butylamine)
chlorobutyryl(N-methyl-omega-phenyl-tertiary butylamine).

I claim:
1. In a method for the preparation of a compound of the structure:

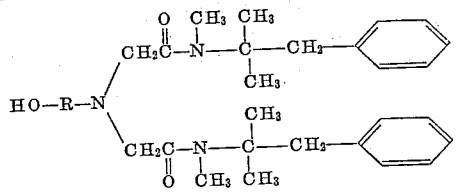

wherein R represents divalent lower alkylene of 2 to 4 carbon atoms which comprises heating a lower alkanolamine of 2 to 4 carbon atoms with a halo fatty acid amide in which the amido radical has N-methyl and N-(α,α-dimethylphenethyl) substituents, to a temperature of about 70–80° C., the improvement which comprises (1) employing as the selective reaction solvent the compound dimethylformamide (2) and concurrently conducting the reaction in the presence of triethylamine.

2. A method according to claim 1 wherein the lower alkanolamine is ethanolamine.

3. In a method for the preparation of a compound of the structure:

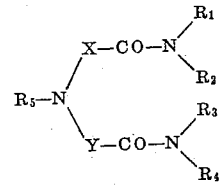

wherein $R_1$ and $R_3$ represent lower alkyl, $R_2$ and $R_4$ represent aralkyl selected from phenyl lower alkyl, β-hydroxy-β-phenyl lower alkyl (substituted phenyl), lower alkyl, or β-hydroxy-β-(substituted phenyl), lower alkyl wherein the substituted phenyl is phenyl substituted with lower alkyl, lower alkoxy, hydroxy, halogen, nitro, amino, mono- or di-lower alkylamino, and $R_5$ represents hydroxy substituted lower alkyl, X and Y each representing divalent lower alkylene, which comprises reacting a lower alkanolamine with an alpha halo fatty acid amide in which the amido radical has N-lower alkyl and N-aralkyl substituents, the improvement which comprises employing dimethylformamide as a selective reaction solvent in the presence of triethylamine.

References Cited

UNITED STATES PATENTS 2,780,646  2/1957  Seifter et al. _____ 260—562 X

OTHER REFERENCES

Freed et al.: Jour. Org. Chem., vol. 26, pp. 2378–83 (1961).

Seifter et al.: Soc. Exper. Biol. Med., vol. 109, pp. 664–8, 1962.

JOHN D. RANDOLPH, *Primary Examiner.*

WALTER A. MODANCE, *Examiner.*

N. TROUSOF, *Assistant Examiner.*

UNITED STATES PATENT OFFICE
CERTIFICATE OF CORRECTION

Patent No. 3,350,446            October 31, 1967

William F. Bruce

It is hereby certified that error appears in the above numbered patent requiring correction and that the said Letters Patent should read as corrected below.

Column 4, line 50, for "alkyl (substituted phenyl)," read -- alkyl, (substituted phenyl) --; line 51, for "phenyl)," read -- phenyl) --.

Signed and sealed this 25th day of February 1969.

(SEAL)
Attest:

Edward M. Fletcher, Jr.
Attesting Officer

EDWARD J. BRENNER
Commissioner of Patents